United States Patent [19]

Hillinger

[11] Patent Number: 4,644,140
[45] Date of Patent: Feb. 17, 1987

[54] ELECTRIC HEATING ARRANGEMENT FOR SPRAY NOZZLES

[75] Inventor: Erich Hillinger, Tuttlingen, Fed. Rep. of Germany

[73] Assignee: Turk & Hillinger GmbH, Tuttlingen, Fed. Rep. of Germany

[21] Appl. No.: 646,314

[22] Filed: Aug. 30, 1984

[30] Foreign Application Priority Data

Dec. 27, 1983 [DE] Fed. Rep. of Germany ....... 3347160

[51] Int. Cl.⁴ .......................... H05B 3/00; B29F 1/03; B29C 35/00; H01C 1/032
[52] U.S. Cl. .................................. 219/535; 219/301; 219/311; 219/421; 219/530; 219/536; 219/544; 222/146.5; 239/133; 338/239; 338/247; 425/549
[58] Field of Search ............... 219/296, 301, 302, 214, 219/530, 534, 535, 536, 540, 544, 311, 421; 425/548, 549; 239/133, 135; 222/146.1, 146.5; 338/238-242, 243-248

[56] References Cited

U.S. PATENT DOCUMENTS

| | | | |
|---|---|---|---|
| 1,127,373 | 2/1915 | Read | 338/238 X |
| 1,881,444 | 10/1932 | Flanzer | 219/301 X |
| 2,036,788 | 4/1936 | Abbott | 338/238 |
| 2,721,729 | 10/1955 | Van Riper | 219/301 X |
| 2,767,288 | 10/1956 | Lennox | 338/238 |
| 3,247,359 | 4/1966 | Feld | 219/301 X |
| 3,849,630 | 11/1974 | Halliday | 219/544 X |
| 4,150,281 | 4/1979 | Hinz | 219/544 X |
| 4,196,855 | 4/1980 | Osuna-Diaz | 425/549 X |

FOREIGN PATENT DOCUMENTS

| | | | |
|---|---|---|---|
| 1291452 | 3/1969 | Fed. Rep. of Germany | 219/301 |
| 2250778 | 3/1973 | Fed. Rep. of Germany | . |
| 3100092 | 7/1982 | Fed. Rep. of Germany | 219/421 |
| 314839 | 7/1929 | United Kingdom | 338/245 |

*Primary Examiner*—Anthony Bartis
*Attorney, Agent, or Firm*—Fay, Sharpe, Fagan, Minnich & McKee

[57] ABSTRACT

An electrically heated spray nozzle, such as for spraying plastics, includes a highly compressed tubular heating body wound about a spray nozzle as a plurality of coil windings. The heating body has a tubular steel inner jacket containing a pair of spaced electric heating elements embedded in a high compressed powdered insulating material. A copper outer jacket encases the inner jacket and a hard solder connection joint as least as broad as the diameter of the outer jacket connects the outer jacket and hence the heating body to the nozzle. The number of coil windings per unit length of nozzle body is larger near the ends of the nozzle than near its middle. A steel wear-resistant lining may cover the surface of the nozzle bore.

8 Claims, 3 Drawing Figures

ELECTRIC HEATING ARRANGEMENT FOR SPRAY NOZZLES

BACKGROUND OF THE INVENTION

This invention generally concerns electric heating arrangements. More specifically, the present invention relates to an electric heating arrangement for spray nozzles, such as those used to spray plastics, in which a highly compressed tubular heating body, provided with a metal jacket, is arranged in coil form directly on the nozzle body.

Conventional electrically heated spray nozzles, or injection jets for plastics or synthetics, include, for example, the nozzle disclosed in Ger. Pat. No. 3,100,092. To obtain the necessary good transfer of heat from the heating element to the nozzle, the tubular heating body coil is imbedded, in this case, in a highly compressed metal powder, and this structure is surrounded by a sheathing tube. This construction requires a certain extra expense and the total diameter of the spray nozzle becomes greater thereby, which is not always desirable.

A conventional heating arrangement of a similar kind is shown in Ger. Pat. No. 2,250,778. Here, the object to be heated is provided with a spiral groove which receives a heating cable. This construction also is surrounded by a covering sheath. Extra expense and an increased total diameter are to be noted here also.

Accordingly, it has been considered desirable to develop a new and improved electric heating arrangement for a spray nozzle which would overcome the foregoing difficulties and others while providing better and more advantageous overall results.

BRIEF SUMMARY OF THE INVENTION

The present invention attacks the problem of providing a heating arrangement which has a simple and compact structure and assures a uniformly good heat transfer, adaptable to the particular thermal conditions given by the kind of spray nozzle.

More particularly in accordance with the invention, an electric heating arrangement for spray nozzles includes a highly compressed tubular heating body which is provided in an inner jacket arranged in coiled form directly on the nozzle body. The inner jacket of the tubular heating body is enclosed in an outer jacket made of a highly conductive and heat resistant material. The outer jacket is hard-soldered to the nozzle body.

This new kind of heating arrangement is simple in construction and provides a relatively small total diameter for the spray nozzle. The distribution of the heat produced in the heating body can be designed without difficulty according to the given requirements. Also, in the tubular heating body, instead of a jacket of CrNi, usual up to now, a jacket of steel can be used, which is not only less expensive, but also gives a still further improved heat conduction from the heating line to the object to be heated.

In accordance with another aspect of the invention, the number of coil windings of the tubular heating body per length unit of the nozzle body becomes greater toward the ends of the nozzle body.

According to another aspect of the invention, the nozzle body is provided with an inner lining which encloses the nozzle bore with this lining being made of a material highly resistant to wear. Such a material may include steel.

According to still another aspect of the invention, the inner jacket is made of steel and the outer jacket is made of copper.

A process for manufacturing an electric heating arrangement for spray nozzles, according to the invention, includes the step of rolling an outer jacket onto an inner jacket while at the same time highly compressing a tubular heating body enclosed by the inner jacket.

The principal advantage of the present invention is the provision of a new electric heating arrangement for a spray nozzle and a method for manufacturing such a nozzle.

Another advantage of the present invention is the provision of a heating body outer jacket which is inexpensive yet provides for good heat transfer.

Still another advantage of the present invention is the provision of a relatively small diameter heating arrangement for a spray nozzle.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
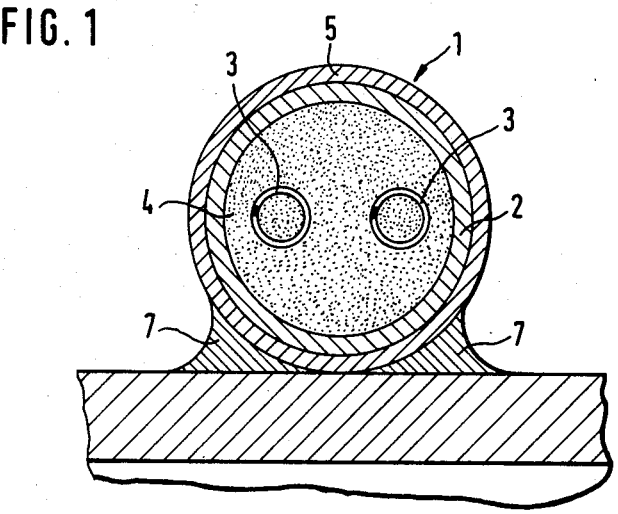
FIG. 1 is a cross-sectional view through the heating arrangement according to the present invention.

As FIG. 1 shows, the tubular heating body 1 includes an inner jacket 2, of steel, in which a heating line 3 including a pair of spaced heating elements is imbedded by means of a highly compressed insulating material 4. The tubular heating body also has an outer jacket 5, which consists of copper or another good-conductive and heat resistant material. This outer jacket 5 can be pushed onto the inner jacket 2 in the form of a tubular piece, and then rolled onto the inner jacket or otherwise secured thereto. During this rolling process, at the same time, a high compression of the entire tubular heating body can take place.

This tubular heating body 1, provided with the outer jacket 5, is then wound or coiled onto the nozzle body 6 and hard-soldered to the latter. A hard-solder seam 7 between the heating body 1 and the nozzle body 6 is of relatively great width dimension, so that a broad, and thus a good, transfer of heat from the tubular heating body 1 to the nozzle body 5 can take place.

Figure 2:
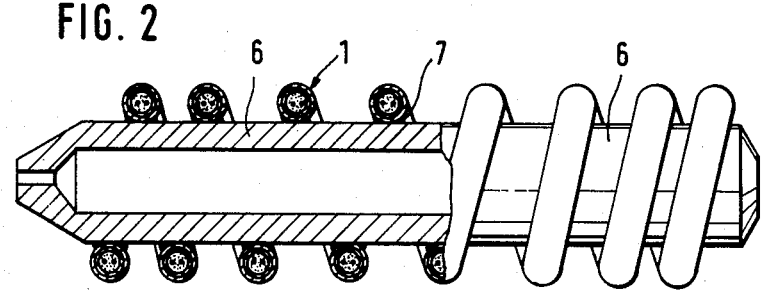
FIG. 2 is a reduced side elevational view in partial cross section of the heating arrangement of FIG. 1 placed on a nozzle body; and, FIG. 3 is a side elevational view in partial cross section of another nozzle provided with the heating arrangement according to the present invention.
Figure 3:
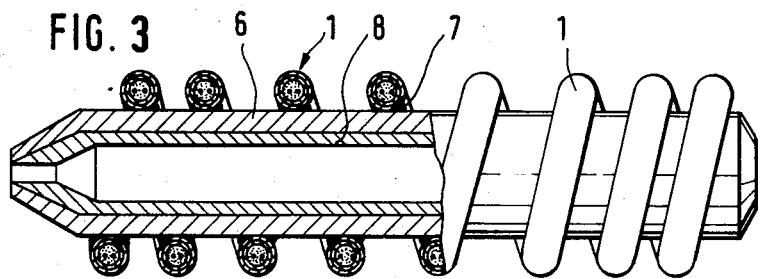

As FIGS. 2 and 3 show, spiraling of the wound-on heating body coil is so designed that toward both ends of the nozzle body 6, more coil windings occur on the nozzle body unit per length of the nozzle body. Because this is done, the circumstance is taken into account that the spray nozzle is clamped into the tool at its ends, and at these points, naturally, more heat flows out. It is evident that the distribution of the heat produced by the heating body can also be designed to suit various other requirements as well.

As appears from the embodiment of FIG. 3, the nozzle body 6, provided with the heating arrangement according to the invention can still be equipped with an inner lining or jacket 8, of highly wear-resistant steel or a corresponding steel alloy, when especially abrasive substances, for example, plastic filled with glass, are to be worked.

The present invention thus provides an electric nozzle heating arrangement which has a simple, compact structure and makes possible a uniformly good heat transfer and which is also adaptable to the thermal conditions present. This is done by a heating arrangement which includes a metal jacket provided on a tubular heating body with the metal jacket being provided with an additional outer jacket of a material having good heat conduction capabilities, as well as resistance to melting. This jacket is hard-soldered to the nozzle body.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described a preferred embodiment of the present invention, it is now claimed:

1. A method for the production of an electrically heated spray nozzle comprising the steps of:
   providing a spray nozzle;
   providing an electric heating line including providing a pair of spaced electric heating elements imbedded in a powdered insulation material in a tubular steel inner jacket;
   rolling a copper outer jacket onto said inner jacket to form a tubular heating body;
   simultaneously compressing said tubular heating body;
   coiling said tubular heating body onto said spray nozzle; and,
   soldering said outer jacket, by a hard solder connection joint, to said spray nozzle as a plurality of coil windings along the length of the nozzle thereby securing said heating body to said spray nozzle, wherein said connection joint is at least as broad as the diameter of said outer jacket.

2. The method of claim 1 further comprising the step of providing more coil windings per unit length of said spray nozzle at the ends of said spray nozzle than in a center portion of said nozzle.

3. An electrically heated spray nozzle for spraying plastics and the like, comprising:
   a highly compressed tubular heating body coiled around a spray nozzle as a plurality of coil windings along the length of the nozzle, said heating body comprising:
      a steel inner jacket provided on said heating body and containing a heating line including a pair of spaced electric heating elements imbedded in a highly compressed powdered insulating material,
      a copper outer jacket encasing said inner jacket, said outer jacket also resisting melting; and,
   a hard solder connection joint connecting said outer jacket, and hence said heating body to said spray nozzle, said connection joint being at least as broad as the diameter of said outer jacket.

4. The spray nozzle of claim 3 wherein the number of coil windings per unit length of said nozzle body is larger near the ends of said nozzle body than near its middle.

5. The spray nozzle of claim 3 wherein said nozzle body is provided with an inner lining covering the surface of the nozzle bore.

6. The spray nozzle of claim 5 wherein said inner lining is made of a highly wear resistant material.

7. The spray nozzle of claim 6 wherein said material includes steel.

8. The spray nozzle of claim 3 wherein said solder connection joint includes two broad solder seams to allow for efficient heat transfer between said heating body and said spray nozzle.

* * * * *